United States Patent
Kamei

(10) Patent No.: US 8,614,820 B2
(45) Date of Patent: Dec. 24, 2013

(54) TERMINAL DEVICE CONNECTED TO A NETWORK, A PRINTING SYSTEM INCLUDING THE TERMINAL DEVICE, AND A CONTROL METHOD OF THE TERMINAL DEVICE

(75) Inventor: Tasuku Kamei, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 322 days.

(21) Appl. No.: 13/209,332

(22) Filed: Aug. 12, 2011

(65) Prior Publication Data

US 2012/0057196 A1    Mar. 8, 2012

(30) Foreign Application Priority Data

Sep. 3, 2010    (JP) ................. 2010-197927

(51) Int. Cl.
*G06K 15/02*    (2006.01)
(52) U.S. Cl.
USPC .......................... 358/1.15; 358/434; 358/440
(58) Field of Classification Search
USPC ........ 358/1.1, 1.13, 1.15, 400, 401, 434, 435, 358/436, 438, 439, 440
See application file for complete search history.

(56) References Cited

U.S. PATENT DOCUMENTS

| | | | |
|---|---|---|---|
| 7,107,442 B2 * | 9/2006 | Cheshire | 713/1 |
| 7,702,797 B2 * | 4/2010 | Imine | 709/227 |
| 8,261,113 B2 * | 9/2012 | Yasuda | 713/320 |
| 2008/0174819 A1 * | 7/2008 | Hada | 358/1.15 |
| 2011/0078464 A1 * | 3/2011 | Yokomizo | 713/300 |
| 2011/0208986 A1 * | 8/2011 | Soga | 713/323 |

FOREIGN PATENT DOCUMENTS

| | | |
|---|---|---|
| JP | 09-141974 | 6/1997 |
| JP | 2002-278378 | 9/2002 |
| JP | 2004-110215 | 4/2004 |

* cited by examiner

*Primary Examiner* — Thomas D Lee
(74) *Attorney, Agent, or Firm* — Squire Sanders (US) LLP

(57) ABSTRACT

A terminal device connected to a network, acquires address information of a printing device connected to the network in first communication protocol, determines whether or not the printing device is capable of recovering from a power-saving mode via WOL, registers the acquired address information into a storage area on a permanent basis, if the relevant printing device is determined to be capable of recovering via WOL, and then transmits a status inquiry packet of the relevant printing device determined to be capable of recovering via WOL in second communication protocol that allows the relevant printing device to respond to the status inquiry packet without recovering from the power-saving mode, using the address information registered into the storage area on a permanent basis.

21 Claims, 8 Drawing Sheets

T

| Registration Method | IP address | MAC address |
|---|---|---|
| Time-limited | 192.168.0.10 | 00 55 AA AA BB 01 |
| Permanent | 192.168.0.15 | 00 55 AA AA BB 10 |
| Permanent | 192.168.0.23 | 00 55 AA AA BB 11 |
| ⋮ | ⋮ | ⋮ |

| Status  | Timer | IP address   | MAC address       |
|---------|-------|--------------|-------------------|
| Valid   | T1    | 192.168.0.15 | 00 55 AA AA BB 10 |
| Valid   | T2    | 192.168.0.23 | 00 55 AA AA BB 11 |
| Invalid | —     | —            | 00 55 AA AA BB 25 |
| ⋮       | ⋮     | ⋮            | ⋮                 |

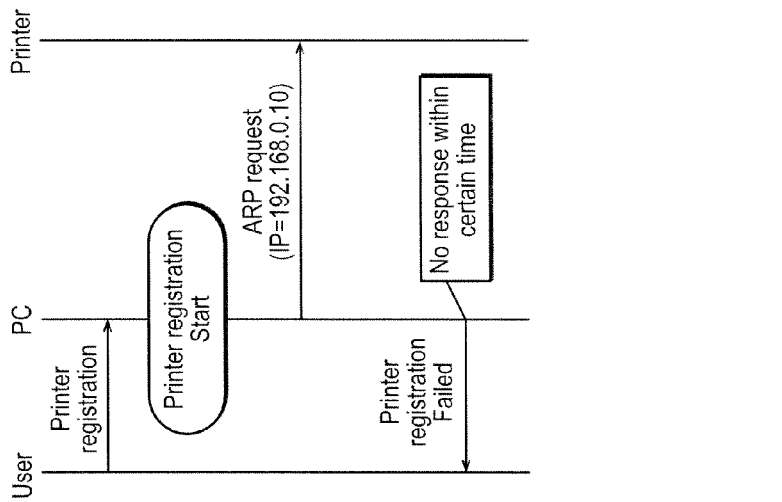
FIG.7(A) WOL-capable
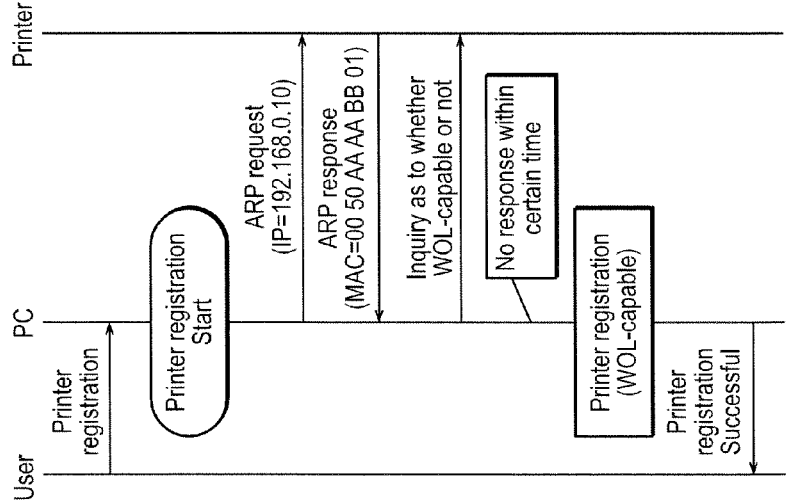
FIG.7(B) WOL-incapable
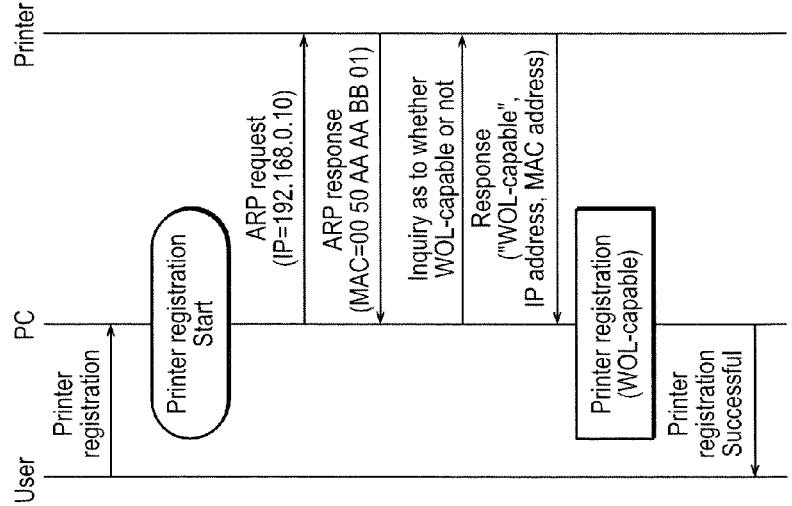
FIG.7(C) No ARP response

TERMINAL DEVICE CONNECTED TO A NETWORK, A PRINTING SYSTEM INCLUDING THE TERMINAL DEVICE, AND A CONTROL METHOD OF THE TERMINAL DEVICE

CROSS-REFERENCE TO RELATED APPLICATION

This application is based on Japanese Patent Application No. 2010-197927 filed on Sep. 3, 2010, the contents of which are incorporated herein by reference.

BACKGROUND

1. Technical Field

The present invention relates to a terminal device connected to a network, a printing system including the terminal device, and a control method of the terminal device.

2. Description of Related Arts

Power-saving functions of electrical equipments such as printers and MFPs (Multiple Functional Peripherals) are attracting more acute attention from the viewpoint of manufacturers' and users' social responsibilities. In particular, industrialized countries have implemented various procurement regulations which require public institutions to evaluate power-saving capabilities of electrical equipments (e.g. Laws on Promoting Green Purchasing) as well as various distribution regulations (e.g. Directive on Eco-Design of Energy-using Products), in order to ensure that products without a certain level of power-saving capabilities will be removed from the market.

For the purpose of striking a balance between power-saving functions and usability features, a latest control method of a printer or MFP includes steps of switching the printer/MFP into a power-saving mode when its standby mode has passed a certain period of time, and restoring the printer/MFP to a normal mode when it receives a network packet. For example, the Japanese Unexamined Publications No. H09-141974, No. 2002-278378, and No. 2004-110215 propose an image forming device which capable of shutting down the CPU of its printer controller, or lowering clock frequencies of the CPU to shift the printer controller into a power-saving mode. This control method is generally called "WOL" (Wake on LAN).

A network printer generally receives various network packets including printing requests and status inquires as it serves a large number of network devices. In this respect, a WOL-capable network printer needs to be associated with suitable recovery packets to its operating environment so that it can properly recover from a power-saving mode to a normal mode. For example, under a network environment involving frequent status inquiries in SNMP (Simple Network Management Protocol, Well-known Port=161), the printer can hardly maintain its power-saving mode if an SNMP packet is designated as a recovery packet. Therefore, a SNMP packet should not be designated as a recovery packet under such a network environment as described above. Nowadays, a WOL-capable NIC (Network Interface Card) is generally equipped with sophisticated packet selection functions in order to select a suitable recovery packet.

Incidentally, packet transmission under in IP/Ethernet that is known as the most common LAN environment for corporate or domestic use, requires a combination of IP address and MAC address of the transmission destination. The combination of IP address and MAC address is normally stored in a data area called ARP (Address Resolution Protocol) table within a terminal device. If MAC address of the packet destination does not exist in the ARP table, an ARP request needs to be issued for the purpose of inquiring the MAC address corresponding to the IP address of the packet destination. However, an entry of the ARP table will generally be lost in a certain period of time after its registration (e.g. several minutes)

The lost entry from the ARP table will necessitate an ARP request preceding each packet transmission afterwards. However, an ARP requests should not be designated as a recovery packet as a typical printer cannot respond to an ARP request while in a power-saving mode. This causes a problem of frequent interruption of the power-saving mode due to the ARP request preceding each periodic packet such as an SNMP request (See FIG. 9).

The present invention is intended to solve the aforementioned problems in the prior art, and one of the objectives of the present invention is to provide a terminal device which can avoid the interruption of a printer's power-saving mode due to the ARP request preceding each periodic packet including a status inquiry in SNMP, a printing system including the terminal device, and a control method of the terminal device.

SUMMARY

In order to achieve at least one of the aforementioned objectives, a terminal device connected to a network, reflecting one aspect of the present invention comprises: an acquisition unit for acquiring address information of a printing device connected to said network in first communication protocol; a determination unit for determining whether said printing device is capable of recovering from a power-saving mode via WOL (Wake On LAN); a registration unit for registering said address information acquired by said acquisition unit into a storage area on a permanent basis if said printing device is determined to be capable of recovering via WOL; and a transmission unit for transmitting a status inquiry packet of said printing device determined to be capable of recovering via WOL in second communication protocol that allows said printing device to respond to said status inquiry packet without recovering from said power-saving mode, using said address information registered into said storage area on a permanent basis.

Preferably, said terminal device further comprises: a timer setting unit for setting timer on said address information registered by said registration unit into said storage area on a permanent basis; an inquiry unit for transmitting an address inquiry packet for said address information of said printing device in said first communication protocol when said timer set by said timer setting unit expires; and a confirmation unit for confirming whether or not said address information transmitted in response to said address inquiry packet by said inquiry unit is identical with said address information registered into said storage area on a permanent basis, wherein said timer setting unit resets said timer when said confirmation unit confirms that said address information is identical.

Preferably, said timer setting unit resets said timer if no response is made to said address inquiry packet transmitted by said inquiry unit.

Preferably, said address information includes combination of IP address and MAC address.

Preferably, said first communication protocol is ARP (Address Resolution Protocol).

Preferably, said second communication protocol is SNMP (Simple Network Management Protocol).

Preferably, said second communication protocol is SLP (Service Location Protocol).

The objectives, features, and characteristics of this invention other than those set forth above will become apparent from the description given herein below with reference to preferred embodiments illustrated in the accompanying drawings.

BRIEF DESCRIPTION OF THE DRAWINGS

FIG. 5 is a conceptual diagram showing a list of WOL-capable printers according to an embodiment of the present invention.

FIG. 7(A) is a sequence chart corresponding to the flowchart in FIG. 6.

FIG. 7(B) is a sequence chart corresponding to the flowchart in FIG. 6.

FIG. 7(C) is a sequence chart corresponding to the flowchart in FIG. 6.

DETAILED DESCRIPTION

The embodiments of this invention will be described below with reference to the accompanying drawings.

Figure 1:
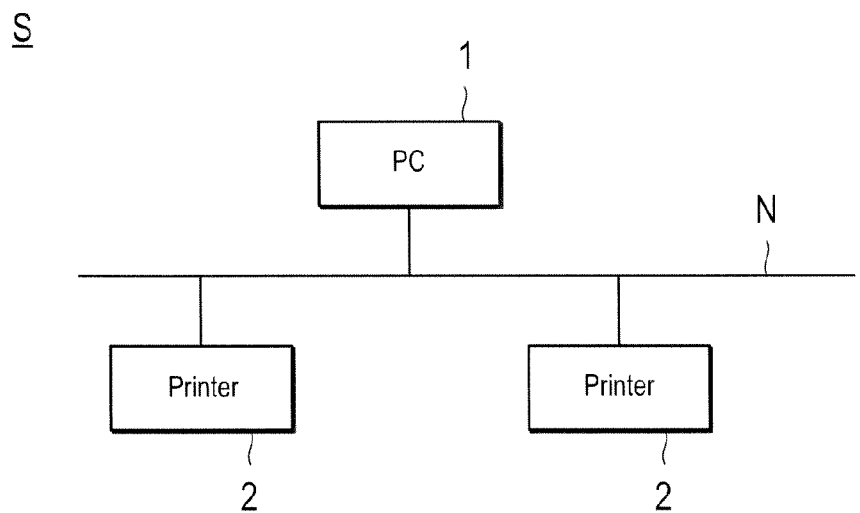
FIG. 1 is a block diagram showing the overall structure of a printing system according to an embodiment of the present invention.

FIG. 1 is a block diagram showing the overall structure of a printing system S according to an embodiment of the present invention. As can be seen from FIG. 1, the printing system S includes a PC 1 serving as a terminal device, and a printer 2 serving as a printing device, and they are connected with each other via a network N. The network N is a computer network complying with the TCP/IP protocol suite such as an intranet consisting of a combination of Ethernet® and TCP/IP. The number and types of the equipments connected to the network N are not limited to the example shown in the drawings.

Figure 2:
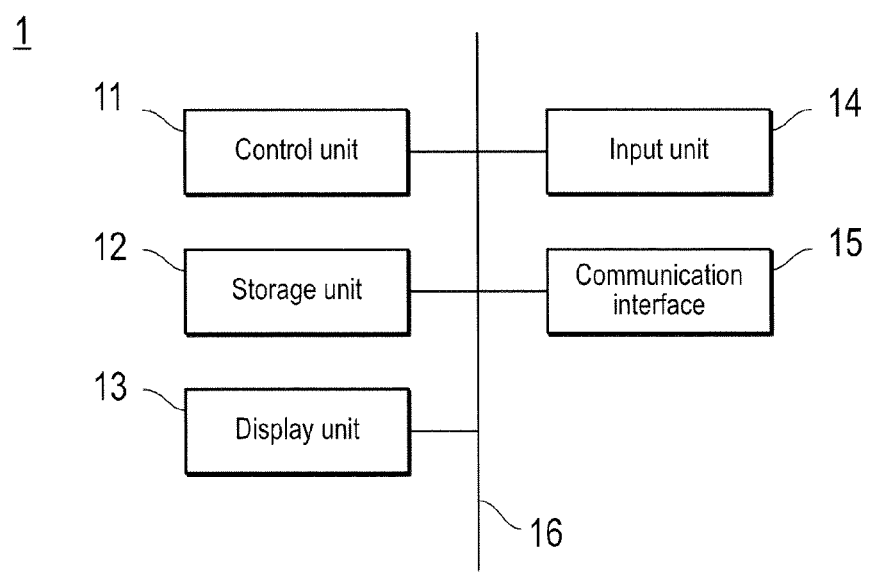
FIG. 2 is a block diagram showing the structure of a PC according to an embodiment of the present embodiment.

The following is a description of the structure of the aforementioned equipments. FIG. 2 is a block diagram showing the structure of the PC 1 according to the present embodiment. As shown in FIG. 2, the PC 1 according to the present embodiment is equipped with a control unit 11, a storage unit 12, a display unit 13, an input unit 14, and a communication interface 15, and they are connected via bus 16 for exchanging signals. Each of these units will be described in detail.

The control unit 11 is a CPU for controlling the operation of each unit in accordance with a control program, and executing various arithmetic processing. The storage unit 12 includes a ROM storing programs and parameters for controlling the basic operation of the PC 1, a RAM for temporarily storing data to serve as a working area, an HDD storing an OS (Operating System), various programs and parameters for the processing by the PC 1, etc. The storage unit 12 according to the present embodiment further includes an ARP table T, and a list L of WOL-capable printers, both of which will be described later.

The display unit 13 is a display device such as an LCD for displaying various information to a user. The input unit 14 is an input device such as a keyboard and a mouse for receiving operation instructions from a user. The communication interface 15 is a network interface such as an NIC for connecting the PC 1 with the network N for communications with other equipments including the printer 2.

The PC 1 according to the present embodiment is equipped with a printer driver for sending a print request to the printer 2 via the network N, an ARP client software program for issuing an inquiry packet for the MAC address corresponding to an user-specified IP address (i.e. ARP request), and a SNMP client software program for issuing a status inquiry packet of the printer 2 on the network N in SNMP (i.e. SNMP request). An SLP (Service Location Protocol) client software program can be substituted for the SNMP client software program, in order to issue a status inquiry packet of the printer 2 (i.e. SLP request).

The aforementioned ARP client software program is provided with a functions to issue an ARP request with reference to an user-specified IP address, to report to a user on the response to the ARP request, to register a combination of IP and MAC addresses into the ARP table T within the storage unit 12, to search the ARP table T for the entry corresponding to a user-specified IP or MAC address received as a search key.

Figures 3, 4:
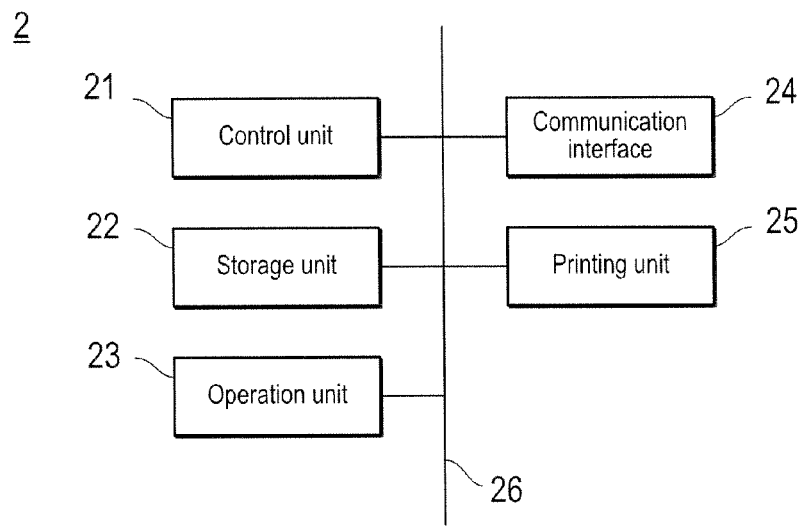
FIG. 3 is a block diagram showing the structure of a printer according to an embodiment of the present invention.
FIG. 4 is a conceptual diagram showing an ARP table according to an embodiment of the present embodiment.

FIG. 4 is a schematic diagram showing an example of the ARP table T where each printer 2 has been registered by the ARP client software. As shown in FIG. 4, each entry of the ARP table contains information on "IP Address" and "MAC Address" for each printer 2 as well as information on "Registration Method". The "Registration Method" according to this embodiment falls into either "Time-limited" meaning that the relevant entry will be lost in a certain period of time, or "Permanent" meaning that the relevant entry will be maintained on a permanent basis (i.e. the entry will not be lost). As described later, timer can be set on each entry registered on a "Permanent" basis so that the relevant entry will be refreshed when the timer expires. The processing for registering each printer 2 into the ARP table T will be described later (See FIG. 6).

The non-volatile area (such as HDD) within the storage unit 12 of the PC 1 stores the list L which contains information on the WOL-capable printers connected to the network N. A WOL-capable printer according to the present invention means a printer equipped with a function to turn its CPU into a power-saving mode when a certain period of time has passed in its standby mode (hereinafter called as "WOL function"), and to recover to its normal mode when it receives a designated packet (hereinafter called as "recovery packet") via the network N. A printer without the WOL function is hereinafter called as a "WOL-incapable printer" for a comparison purpose.

FIG. 5 is a conceptual diagram showing the list L of WOL-capable printers containing entries corresponding to the WOL-capable printers 2 connected to the network N. As shown in FIG. 5, each entry in the list L includes information on "Status", "IP Address", and "MAC Address" of the relevant WOL-capable printer 2 as well as information on "Timer" setting on each entry. The "Status" information according to the present embodiment falls into either "Valid" meaning that the WOL function of the relevant WOL-capable printer 2 is currently available, or "Invalid" meaning that the WOL function is currently unavailable. The "Timer" setting indicates the initial setting time for each entry. As described later, the PC 1 determines whether or not the "Valid" status of each entry should be maintained when the remaining time of the timer reaches zero. The initial setting time of the timer (i.e. T1 and T2 in FIG. 5) should preferably range between several minutes to several hours although it can be adjusted as appropriated to the network environment.

FIG. 3 is a block diagram showing the structure of the printer 2 according to an embodiment of the present invention. As shown in FIG. 3, the printer 2 according to the present embodiment includes a control unit 21, a storage unit 12, a storage unit 22, an operation unit 23, a communication interface 24, and a printing unit 25, and they are connected via bus 26 for exchanging signals. Each of these constituents will be described as follows.

The control unit 21 is a CPU for controlling the operation of each unit in accordance with a control program, and executing various arithmetic processing. The storage unit 22 includes a ROM, a RAM, and an HDD. The operation unit 23 is an operation panel for displaying status and setting information of the printer 2 to a user, and for receiving various operational instructions from a user. The communication interface 24 is a network interface such as an NIC for connecting the printer 2 to the network N for communications with other equipment such as the PC 1.

The printing unit 25 is a printer engine for executing print processing based on a print job received from the PC 1's printer driver. More specifically, the printing unit 25 executes the electro-photographic print processing which includes a charging step for charging the photoconductive drum, an exposing step for forming a latent image on the photoconductive drum by a laser beam, a developing step for forming a toner image by attaching toner to the latent image on the photoconductive drum, a transferring step for transferring the toner image on the photoconductive drum to the recording paper by a transferring belt, and a fixing step for heating and fixing the toner image transferred to the recording paper by a fixing roller. The printing unit 25 can also adopt a different printing method such as the impact method, the thermal transfer method, and the ink-jet method.

Table 1 below illustrates power-saving settings for each of the printers 2 that can be classified into either a WOL-capable printer or a WOL-incapable printer according to its model. As shown in Table 1, only a print request from the PC 1 is designated as a network packet for causing the printer 2 to recover from the power-saving mode to the normal mode (i.e. a recovery packet). In the present embodiment, the printer 2 in the power-saving mode will recover to the normal mode only when it receives a print request from the PC 1, meaning that the printer 2 does not recover to the normal mode even when it receives other network packets such as ARP and SNMP requests.

TABLE 1

| Packet Type | Recovery from power-saving mode |
| --- | --- |
| Print request | Recovering from power-saving mode (i.e. designated as recovery packet). |
| SNMP (SLP) request | Remaining in power-saving mode (i.e. not designated as recovery packet). |
| ARP request | Remaining in power-saving mode (excluded from recovery packet). |
| Other | Remaining in power-saving mode (not designated as recovery packet). |

TABLE 1-continued

The WOL-capable printer 2 according to the present embodiment is equipped with functions to issue, in response to an inquiry packet as to whether or not it is a WOL-capable printer, a response packet containing its IP and MAC addresses as well as a response saying that it is a WOL-capable printer. Moreover, the WOL-capable printer 2 can also issue a response packet saying that it temporarily falls into a WOL-incapable printer if such power-saving setting is applicable. On the other hand, the PC 1 determines that the printer 2 for inquiry is a WOL-incapable printer if it receives no response to the inquiry packet. These behaviors will be described more in detail later.

Figure 6:
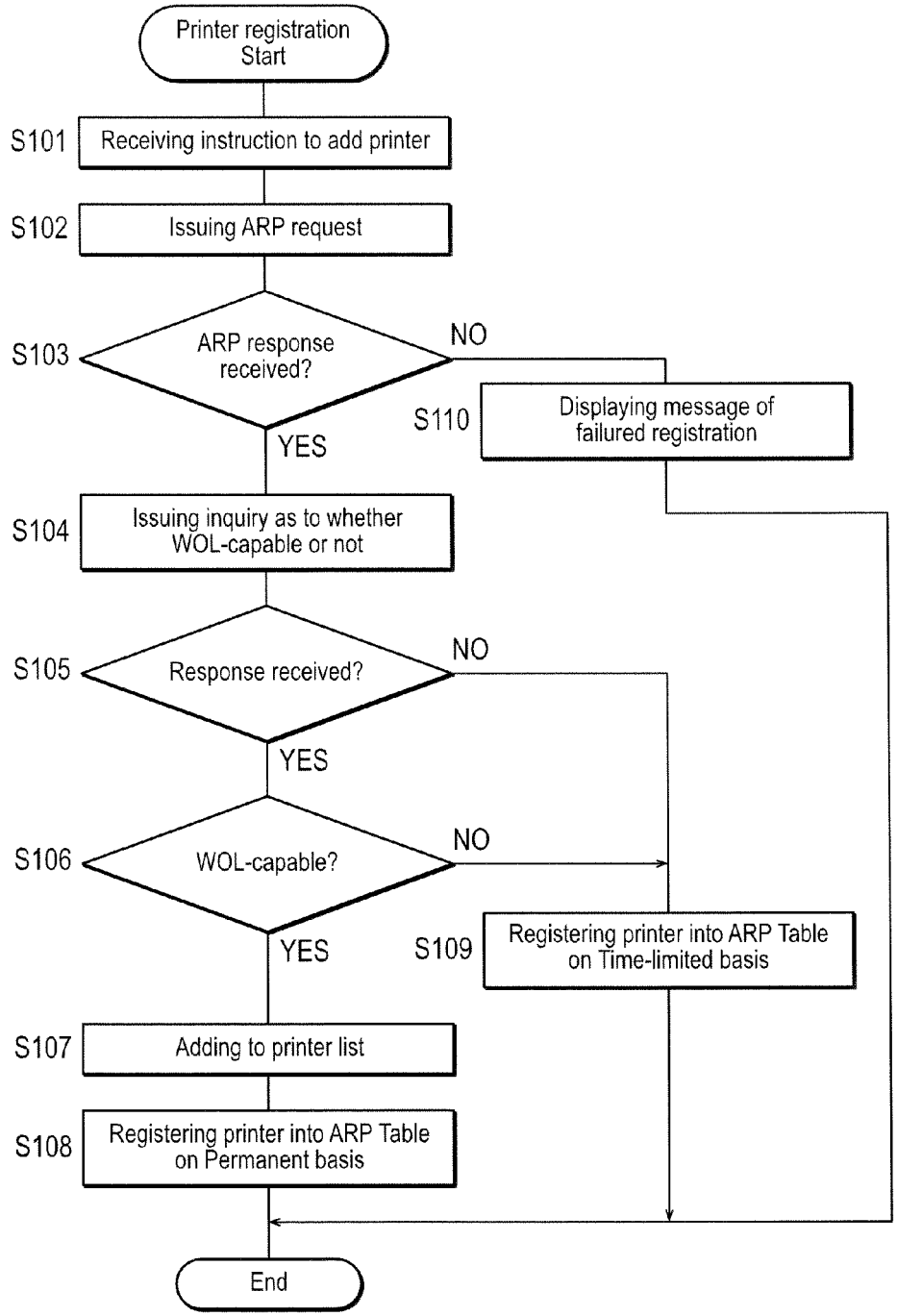
FIG. 6 is a flowchart showing the processing by a PC according to an embodiment of the present invention.

The following is an outline of the PC 1's operations according to the present embodiment. FIG. 6 is a flowchart showing the steps of the processing for registering the PC 2 on the network N into the ARP table T (hereinafter called as "printer registration"). The algorithm shown in the flowchart in FIG. 6 is stored as a control program in the ROM, and is read into the RAM to be executed when the operation starts.

First, the PC 1 receives a user's instruction to add the printer 2 (S101). In this respect, the user specifies the IP address of the printer 2 for registration via the input unit 14. The PC 1 then issues an ARP request based on the user-specified IP address (S102), and stands by for a response from the printer 2.

The PC 1 determines whether or not it receives an ARP response from the printer 2 (S103), and then moves onto S104 shown below when it receives an ARP response (S103: Yes). On the other hand, the PC 1 displays a message saying that the printer 2 failed to be registered on the display 13 (S110) if it receives no ARP response (S103: No), and then finishes the series of steps (End).

Next, the PC 1 issues an inquiry as to whether or not the printer 2 is a WOL-capable printer (S104), and stands by for the response from the printer 2. The PC 1 then moves onto the S106 to be described later if it receives an answer from the printer 2 within a certain period of time (S105: Yes). On the other hand, the PC 1 registers the printer 2 into the ARP table T on a "Time-limited" basis (S109) if it receives no response from the printer 2 within a certain period of time (S105: No), and then finishes the series of steps.

Next, the PC 1 determines whether or not the printer 2 is a WOL-capable printer (S106), with reference to the response from the printer 2. The PC 1 adds the printer 2 into the list L as a "Valid" entry (S107) if the printer 2 is determined to be a WOL-capable printer (S106: Yes). However, the PC 1 adds the WOL-capable printer 2 as an "Invalid" entry if it is temporarily configured to be incapable of recovering via WOL.

After that, the PC 1 registers the entry added in S107 to the list L, into the ARP table T on a "Permanent" basis (S108), and finishes the series of steps (End). This triggers a timer-control of the "Permanent" entry of the ARP table T. On the other hand, the PC 1 registers an entry for the printer 2 into the ARP table T on a "Time-limited" basis (S109) if the printer 2 is determined to be a WOL-incapable printer (S106: No), and then finishes the series of steps (End).

Each of FIG. 7(A), FIG. 7(B), and FIG. 7(C) is a sequence chart showing signals exchanged between the PC 1 and the printer 2 in line with the printer registration described above (See FIG. 6). FIG. 7(A) shows the signals exchanged in the case where the printer 2 is determined to be a WOL-capable printer (S106: Yes), FIG. 7(B) shows those in the case where the printer 2 is determined to be a WOL-incapable printer (S106: No), and FIG. 7(C) shows those in the case where the printer 2 makes no ARP response (S103: No).

Figure 8:
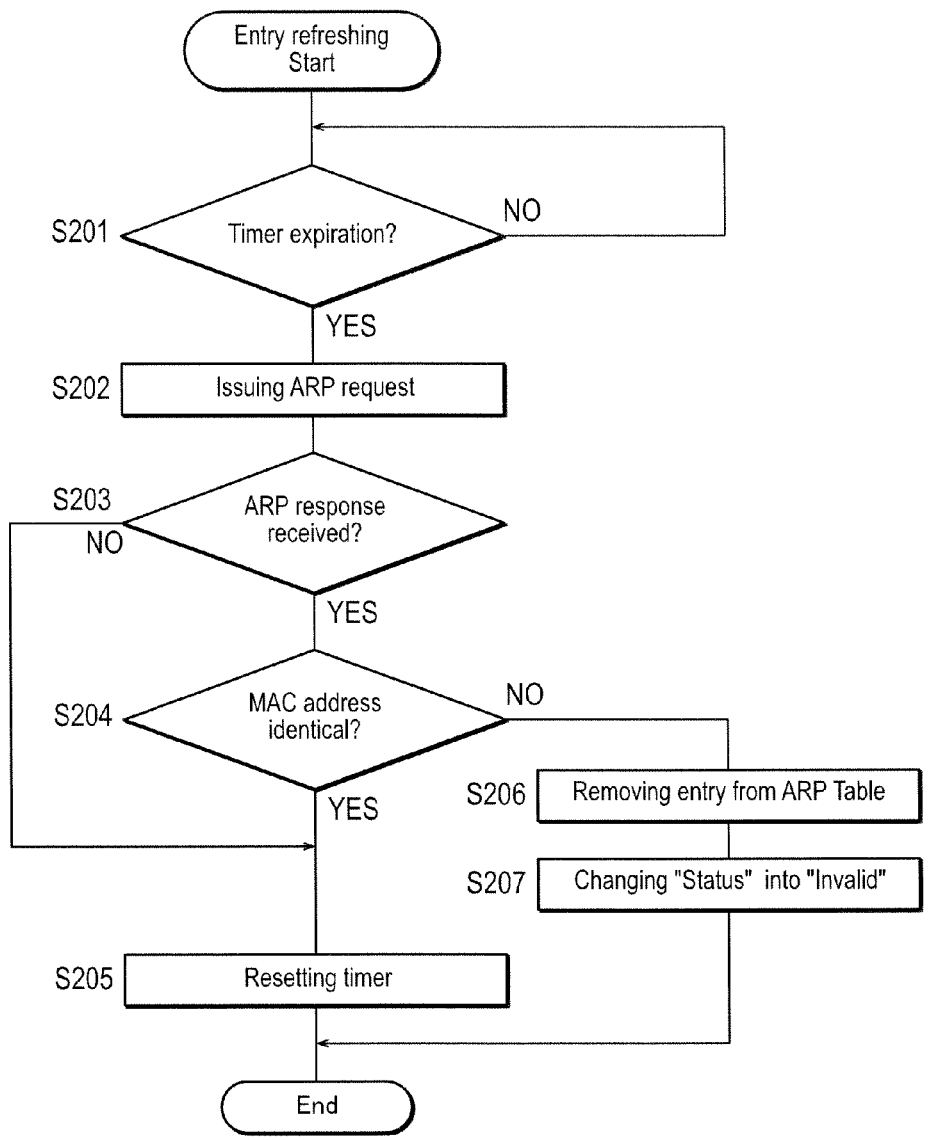
FIG. 8 is a flowchart showing the processing by a PC according to an embodiment of the present invention.

The following is a description the processing for refreshing each entry registered into the ARP table T on a "Permanent" basis during the printer registration shown in FIG. 6. This processing is called "entry refreshing", and it takes place when the timer expires. FIG. 8 is a flowchart showing the steps of the entry refreshing according to the present embodiment. The algorithm shown in the flowchart in FIG. 8 is stored as a control program in the ROM of the PC 1, and read into the RAM to be executed when the operation starts.

First, the PC 1 stands by until the timer set on each entry expires (S201: No). The PC 1 reissues an ARP request with reference to the IP address for the relevant entry (S202) when the timer expires (S201: Yes), and stands by for a response from the printer 2. The PC 1 then moves onto the S204 to be described later when it receives a response from the printer 2 within a certain period of time (S203: Yes). On the other hand, the PC 1 determines that the printer 2 corresponding to the entry is either in a power-saving or a power-off mode if it receives no response within a certain period of time (S203: No), and then resets the timer (S205). This causes the relevant entry to remain in the "Permanent" registration.

In S204, the PC 1 determines whether or not the received ARP response has been sent from an identical MAC address as that of the relevant entry, and resets the timer (S205) if the received ARP response has been sent from the identical MAC address (S204: Yes). The PC 1 then finishes the series of steps (End). This causes the relevant entry to remain in a "Permanent" registration. On the other hand, the PC 1 determines that the combination of IP and MAC addresses has been changed if the received ARP response has been sent from a different MAC address (S204: No), and removes the entry from the ARP table T (S206). After that, the PC 1 revises the list L so that the "Status" information corresponding to the removed entry removed in S206 will turn "Invalid" (S207), and then finishes the series of steps (End).

Table 2 below illustrates the PC 1's operation according to the response to the ARP request issued in S202. The PC 1 according to the present embodiment also removes the entry of the ARP table T not only when the ARP response due to the timer expiration has been sent from a different MAC address (S204: No), but also when the ARP response triggered by other events than the timer expiration contradicts the content of the registered entry into the ARP table T on a "Permanent" basis. The PC 1 also removes the entry from the ARP table T if the combination of IP and MAC addresses associated with a print request from the PC 1 does not agree with the content of the registered entry into the ARP table T on a "Permanent" basis.

TABLE 2

| ARP response | Operation |
| --- | --- |
| Sent from identical MAC address (S204: Yes) | Resetting timer and maintaining "Permanent" registration (S205). |
| No response (S203: No) | Resetting timer and maintaining "Permanent" registration (S205). |
| Sent from different MAC address (S204: No) | Removing entry from ARP table T (S206). Revising list L to change "Status" information into "Invalid" (S207). |

The reason for removing the entry from the ARP table T is because the detection of a contradictory MAC address to the registration in the ARP table T is likely to indicate that the IP address then-allocated to the printer 2 has already been real-located to another device. On the other hand, the detection of a contradictory IP address to the registration in the ARP table T is likely to indicate that the IP address of the WOL-capable printer 2 has already been changed, and therefore the PC 1 registers the new combination of IP MAC addresses after removing the relevant entry from the ART table T.

As can be seen from the above, the printing system S according to the present embodiment determines whether or not the printer 2 newly connected to the network N is a WOL-capable printer, and registers an entry into the ARP table T on a "Permanent" basis if the printer 2 is determined to be a WOL-capable printer. Therefore, the present embodiment can effectively prevent the WOL-capable printer 2 from being lost from the ARP table T, thereby avoiding the undesirable interruption of its power-saving mode due to an ARP request preceding each periodic packet including a SNMP request. Consequently, the present embodiment can ensure that the WOL-capable printer 2 will remain in its power-saving mode for a longer period of time, and therefore it can further reduce the power consumption of the WOL-compatible printer 2.

Figure 9:
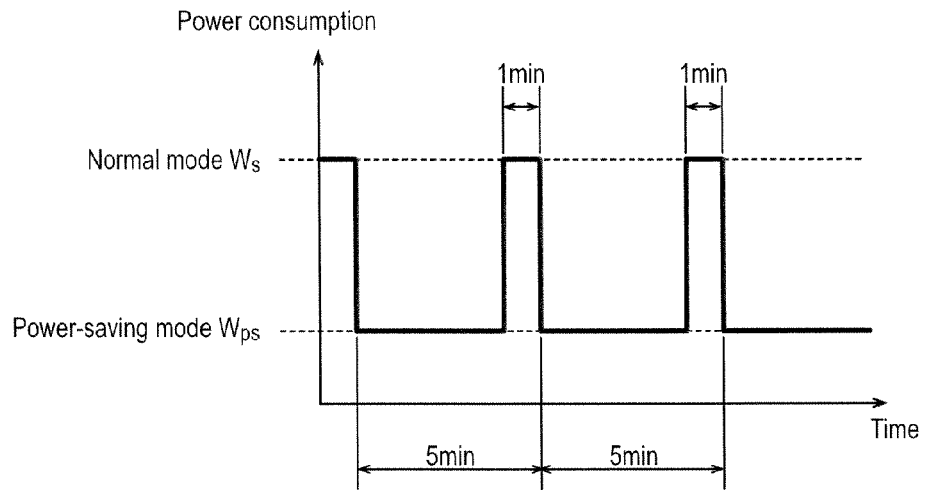
FIG. 9 is a graph showing a temporal change in power consumption of a WOL-capable printer in a conventional printing system.
Figure 10:
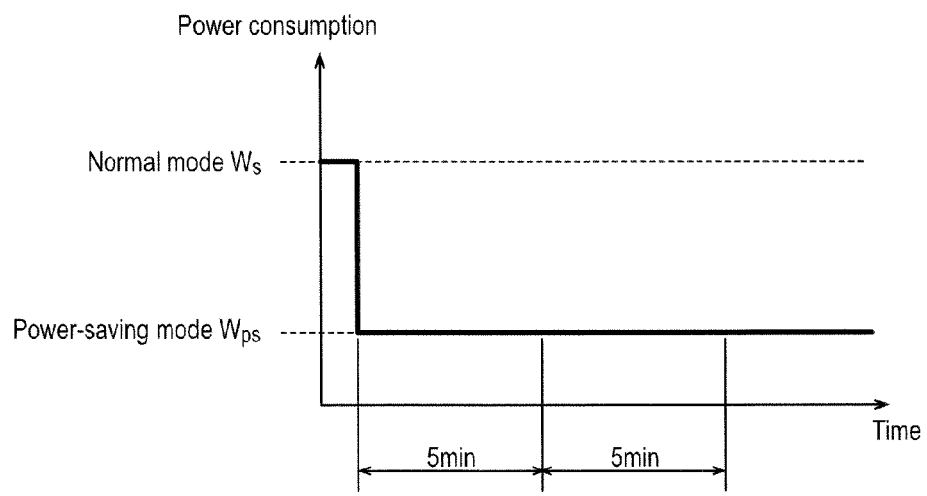
FIG. 10 is a graph showing a temporal change in power consumption of a WOL-capable printer in a printing system according to an embodiment of the present invention.

The following is a description of the power consumption by the WOL-capable printer 2 in the printing system S according to the present embodiment. FIG. 9 is a graph showing a temporal change in the power consumption of a WOL-capable printer in a conventional printing system, and FIG. 10 is a graph showing a temporary change in the power consumption of the WOL-capable printer 2 in the printing system S according to the present embodiment. Both of the graphs assume that the WOL-capable printer receives a SNMP request from the terminal device every 5 minutes, and stands by for 1 minute before shifting into its power-saving mode. In both of the graphs, the symbol "$W_s$" represents the power consumption of the WOL-capable printer in its normal mode, and the symbol "$W_{ps}$" represents the power consumption of the WOL-capable printer in its power-saving mode.

FIG. 9 indicates that each entry in the ARP table T will be lost within several minutes after its registration, according to the conventional printing system. Therefore, the WOL-capable printer will inevitably receive an ARP request prior to each SNMP request issued in every 5 minutes, thereby having its power-saving mode interrupted due to each SNMP request. In other words, under the aforementioned operational condition, the WOL-capable printer will recover from the power-saving mode to the normal mode every 5 minutes, and maintain the normal mode for 1 minute. On the other hand, FIG. 10 indicates that the printing system S according to the present embodiment causes the WOL-capable printer 2 to be registered into the ARP table T as a "Permanent" entry, thereby preventing each entry of the ARP table T from being lost in a certain period of time. Therefore, the WOL-capable printer 2 can maintain its power-saving mode until it receives a print request.

The following is an observation on power-consumption reduction due to the WOL-capable printer 2 in the printing system S according to the present embodiment, with reference to the graphs in FIG. 9 and FIG. 10. The formula (1) shown below expresses power consumption ($W_{old}$) of a WOL-capable printer in a conventional printing system according to the aforementioned operational condition. The formula (2) shown below expresses power consumption ($W_{new}$) of the WOL-capable printer 2 in the printing system S according to the present embodiment.

$$W_{old} = \frac{1}{5} W_s + \frac{4}{5} \times W_{ps} \quad \text{Formula (1):}$$

$$W_{new} = W_{new} = W_{ps}(<W_{old}) \quad \text{Formula (2):}$$

It is well-known that the difference in power consumption between a normal and power-saving mode (i.e. $W_s-W_{ps}$) in a conventional network printer does not extend beyond a few dozens of watts. Under the assumption that the difference in power consumption (i.e. $W_s-W_{ps}$) is 30 watts, the following formula (3) is derived from the formula (1) and the following formula (4) is further derived from the formula (3) and formula (2). The formula (4) reveals that the printing system S according to the present embodiment can further reduce power consumption of the WOL-capable printer 2 by approximately 6 watts, compared to a conventional printing system. Conversion of this power-consumption reduction into watt hour [Wh] indicates that the printing system S according to the present embodiment can reduce power consumption of the WOL-capable printer 2 by approximately 21.6 kWh (=6×60² Wh).

$$W_{old} = W_{ps} + 30/5 \, [W] \quad \text{Formula (3):}$$

$$W_{old} - W_{new} = 30/5 = 6 [W] \quad \text{Formula (4):}$$

Figure 11:
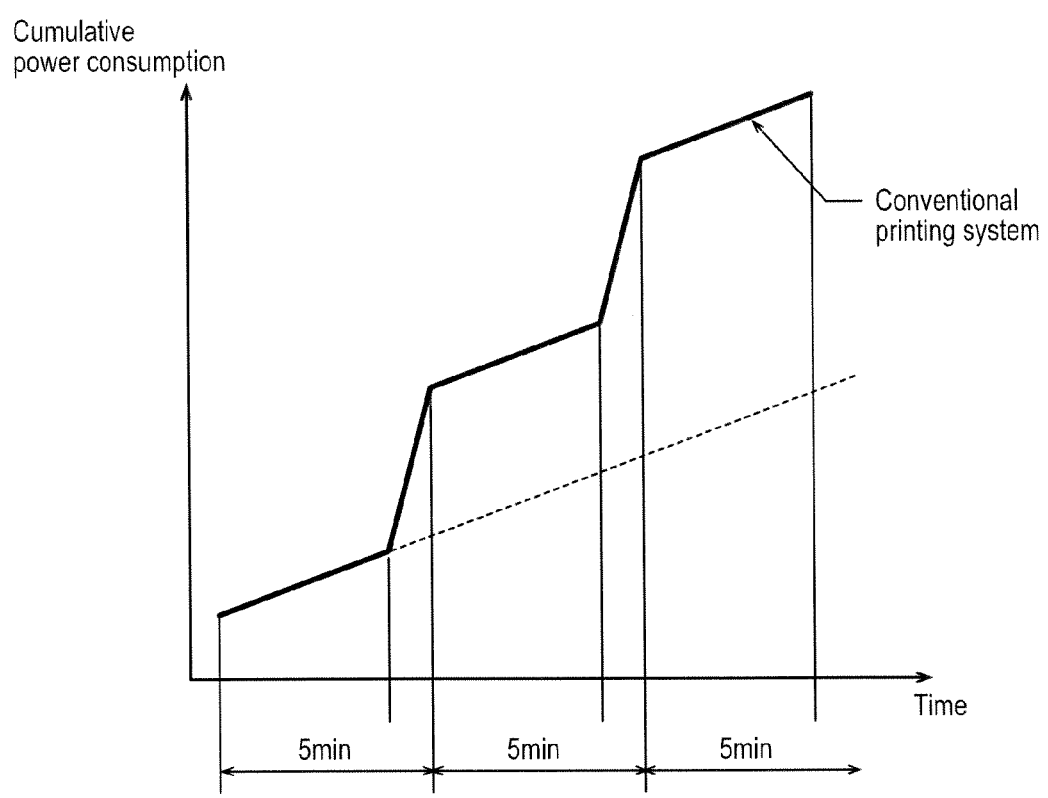
FIG. 11 is a graph showing a cumulative power consumption of a WOL-capable printer in a printing system according to an embodiment of the present invention, in comparison to that of a WOL-capable printer in a conventional printing system.

Moreover, FIG. 11 indicates cumulative power consumption with respect to operational time for each of a WOL-capable printer in a conventional printing system (represented by the solid line) and the WOL-capable printer 2 in the printing system S according to the present embodiment (represented by the dotted line). As shown in FIG. 11, the difference in cumulative power consumption between the conventional printing system and the printing system S according to the present embodiment increases in a cumulative manner with respect to the operational time.

The present invention shall not be limited to the embodiment described above, but it can be modified in a various way within the range of the appended claims. For example, the printing device in the present invention can also be implemented by an MFP equipped with scanning, printing, and copying functions, instead of the printer 2 according to the aforementioned embodiment.

The terminal device according to the present embodiment can also be implemented by a dedicated hardware circuit capable of executing the aforementioned steps, or by a program executed by a CPU to perform the aforementioned steps. If the present invention is implemented by the latter means, the control program of the terminal device can take a form of a computer readable recording medium such as a floppy® disk or a CD-ROM, or a downloadable program file supplied on-line via a network such as Internet. In the former case, the program recorded on the computer readable recording medium is normally transmitted to a memory unit such as a ROM or a hard disk. The above program can also take a form of an application software program or a built-in function of the terminal device.

What is claimed is:

1. A terminal device connected to a network comprising:
   an acquisition unit for acquiring address information of a printing device connected to said network in first communication protocol;
   a determination unit for determining whether or not said printing device is capable of recovering from a power-saving mode via WOL (Wake On LAN);
   a registration unit registering said address information acquired by said acquisition unit into a storage area on a permanent basis if said printing device is determined to be capable of recovering via WOL; and
   a transmission unit for transmitting a status inquiry packet of said printing device determined to be capable of recovering via WOL in second communication protocol that allows said printing device to respond to said status inquiry packet without recovering from said power-saving mode, using said address information registered into said storage area on a permanent basis.

2. The terminal device as claimed in claim 1 further comprising:
   a timer setting unit for setting a timer on said address information registered by said registration unit into said storage area on a permanent basis;
   an inquiry unit for transmitting an address inquiry packet for said address information of said printing device in said first communication protocol when said timer set by said timer setting unit expires; and
   a confirmation unit for confirming whether or not said address information transmitted in response to said address inquiry packet by said inquiry unit is identical with said address information registered into said storage area on a permanent basis, wherein
   said timer setting unit resets said timer if said confirmation unit confirms that said address information is identical.

3. The terminal device as claimed in claim 2, wherein
   said timer setting unit resets said timer if no response is made to said address inquiry packet transmitted by said inquiry unit.

4. The terminal device as claimed in claim 1, wherein
   said address information includes combination of IP address and MAC address.

5. The terminal device as claimed in claim 1, wherein
   said first communication protocol is ARP (Address Resolution Protocol).

6. The terminal device as claimed in claim 1, wherein
   said second communication protocol is SNMP (Simple Network Management Protocol).

7. The terminal device as claimed in claim 1, wherein
   said second communication protocol is SLP (Service Location Protocol).

8. A printing system comprising: a terminal device; and a printing device capable of recovering from a power-saving mode via WOL (Wake On LAN), both connected to a network, wherein
   said terminal device comprising: an acquisition unit for acquiring address information of said printing device on said network in first communication protocol; a registration unit for registering said address information acquired by said acquisition unit into a storage area on a permanent basis; and a transmission unit for transmitting a status inquiry packet of said printing device in second communication protocol that allows said printing device to respond to said status inquiry packet without recovering from said power-saving mode, using said address information registered into said storage area on a permanent basis, and
   said printing device is configured not to recover via WOL when it receives a packet in said first communication protocol.

9. The printing system as claimed in claim 8, wherein
   said terminal device further comprising: a timer setting unit for setting a timer on said address information registered by said registration unit into said storage area on a permanent basis; an inquiry unit for transmitting an address inquiry packet for said address information of said printing device in said first communication protocol when said timer set by said timer setting unit expires; and a confirmation unit for confirming whether or not said address information transmitted in response to said address inquiry packet by said inquiry unit is identical with said address information registered into said storage area on a permanent basis, wherein
said timer setting unit resets said timer if said confirmation unit confirms that said address information is identical.

10. The printing system as claimed in claim 9, wherein said timer setting unit resets said timer if no response is made to said address inquiry packet transmitted by said inquiry unit.

11. The printing system as claimed in claim 8, wherein said address information includes combination of IP address and MAC address.

12. The printing system as claimed in claim 8, wherein said first communication protocol is ARP (Address Resolution Protocol).

13. The printing system as claimed in claim 8, wherein said second communication protocol is SNMP (Simple Network Management Protocol).

14. The printing system as claimed in claim 8, wherein said second communication protocol is SLP (Service Location Protocol).

15. A control method of a terminal device connected to a network, causing said terminal device to execute steps of:
   (A) acquiring address information of a printing device connected to said network in first communication protocol;
   (B) determining whether or not said printing device is capable of recovering from a power-saving mode via WOL (Wake On LAN);
   (C) registering said address information acquired in said step (A) into a storage area on a permanent basis if said printing device is determined in said step (B) to be capable of recovering via WOL; and
   (D) transmitting a status inquiry packet of said printing device determined in said step (B) to be capable of recovering via WOL in second communication protocol that allows said printing device to respond to said status inquiry packet without recovering from said power-saving mode, using said address information registered in said step (C) into said storage area on a permanent basis.

16. The control method as claimed in claim 15 further causing said terminal device to execute steps of:
   (E) setting a timer on said address information registered in said step (C) into said storage area on a permanent basis;
   (F) transmitting an address inquiry packet for said address information of said printing device in first communication protocol when said timer set in said step (E) expires; and
   (G) confirming whether or not said address information transmitted in response to said address inquiry packet transmitted in said step (F) is identical with said address information registered in said step (C) into said storage area on a permanent basis; and
   (H) resetting said timer if said step (G) confirms that said address information is identical.

17. The control method as claimed in claim 16 further causing said terminal device to execute a step of:
   (I) resetting said timer set in said step (E) if no response is made to said address inquiry packet transmitted in said step (F).

18. The control method as claimed in claim 15, wherein said address information includes combination of IP address and MAC address.

19. The control method as claimed in claim 15, wherein said first communication protocol is ARP (Address Resolution Protocol).

20. The control method as claimed in claim 15, wherein said second communication protocol is SNMP (Simple Network Management Protocol).

21. The control method as claimed in claim 15, wherein said second communication protocol is SLP (Service Location Protocol).

* * * * *